Patented Aug. 14, 1928.

1,680,858

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

PROCESS FOR MANUFACTURING RUBBER ARTICLES FROM LATEX.

No Drawing.   Application filed September 22, 1925.   Serial No. 57,959.

This invention relates to improved methods for increasing the rate at which rubber may be deposited from an aqueous dispersion thereof onto a porous body or a pervious web of fibres.

The principal object of the invention is to provide a method for treating rubber latex to increase the rate of deposition of its rubber upon a body porous or pervious to water, but not to rubber. Another object is to increase this rate of deposition by vulcanizing the latex in the presence of a salt of a thiol acid. Still another object is to provide a vulcanized rubber latex having an approximately constant rate of deposition. A further object is to increase the stability of latex by vulcanizing the latex. Another object is to vulcanize latex to a definite degree of vulcanization which does not change to any great extent over a protracted period of time. Other objects will be apparent from the detailed description and claims.

With a preferred embodiment in mind but without intention to place undue limitations upon the scope of the invention except those which may be required by the prior art, the invention consists in treating rubber latex with a salt of a thiol acid, a metallic oxide, and sulphur, and allowing the mixture to become vulcanized at temperatures below 212° F. The invention also includes the vulcanization of latex which has been first treated with organic colloids or pectin bodies.

As as example of the invention the following may be employed:

100 parts by weight of rubber in the form of ammonia preserved latex containing approximately 20% of rubber, 2 parts by weight of zinc oxide, 3 parts by weight of sulphur, 1 part by weight of sodium dithiobenzoate (in aqueous solution).

This mixture is prepared by adding a thin cream of the zinc oxide and sulphur to the latex and then adding the aqueous solution of the dithiobenzoate to the latex. The cream may be made up as follows: 1 part by weight of glue in the form of a 20% solution of glue in water is slowly added to two parts by weight of zinc oxide and 3 parts by weight of sulphur, and the mixture is then rubbed in a mortar until a homogeneous cream is obtained. This may then be diluted to the proper consistency by the addition of water. When large quantities of the cream are to be prepared it will be preferable to use a paint mixer or similar apparatus instead of mortar.

The above mixture will become vulcanized in 1 to 3 hours at approximately 150° F. At the end of this time the vulcanized latex may have become somewhat more viscous than originally. If a piece of unglazed porcelain is dipped into such vulcanized latex and allowed to remain for five minutes the rubber adhering to the porcelain, after drying, will be approximately 0.014 inches thick, which is materially thicker than rubber deposited from a similar unvulcanized latex in the same length of time. The vulcanized latex furthermore becomes practically white, indicating that the dithiobenzoate has changed to a colorless compound.

A film of the rubber from this vulcanized latex possesses a tensile strength of 1600 to 2000 pounds per square inch, and a permanent set of approximately 0.13 inches. Upon standing for a long period, say several months, the extent of vulcanization of the above composition showed only a little alteration, and the thickness of the rubber layer deposited by the latex on a porous form exhibited very little alteration.

The invention may be carried out in the same manner employing latex which has been treated with organic colloids or pectin bodies. This treatment is carried out as follows: The organic colloid or pectin body is dissolved in water and then stirred into ordinary ammonia preserved latex. After standing for some time the rubber in the latex rises to the surface as an uncoagulated layer above an aqueous serum containing most of the non-rubber water soluble constituents of the latex. The aqueous layer may be removed and the uncoagulated rubber layer shaken up in water and treated again with an organic colloid or pectin body. Such treated or creamed latex may be substituted in the above example, and preferably at the same concentration of rubber, namely 20%, although higher concentrations may be employed.

The invention is not limited to the use of sodium dithiobenzoate, for zinc dithiobenzoate and other metallic dithiobenzoates may be employed with equal facility. Xanthogenates may also be employed, although care is required to prevent coagulation. Generally speaking the accelerators which may be used according to this invention comprise compounds of the type $$\underset{X}{\overset{\parallel}{\text{RCSM}}},$$

and more particularly $$\underset{X}{\overset{\parallel}{\text{CCSM}}}.$$

In my copending application Serial No. 57,958, filed Sept. 22, 1925, I have described a process for increasing the rate of deposition of rubber from a rubber latex by treatment with disulphides of the type $$\underset{X}{\overset{\parallel}{\text{RCSSCR}}}.\underset{X}{\overset{\parallel}{}}$$

Vulcanized latex prepared according to this invention does not over-vulcanize, but remains practically constant as to degree of vulcanization. Furthermore this vulcanized latex does not change appreciably in viscosity. Nor does the rate at which the rubber in the vulcanized latex will deposit upon a porous body within a definite length of time change to any great extent. As may be seen from the examples the invention may be applied to ordinary ammonia preserved latex or to latex which contains very little ammonia or no ammonia, as well as to latex which contains a sub-normal amount of water soluble non-rubber constituents, and the claims are to be interpreted as including artificial latices.

Latex vulcanized according to this invention may be employed in the manufacture of rubber articles, and is particularly suited for those which are made by dipping processes. Preferably the dipping process is carried out with a porous form or a pervious web of associated fibres, the deposit being made upon or within the form or web. The deposition of the rubber from such vulcanized latex upon a porous form or a pervious web appears to be somewhat like that of filtration, the solid material remaining on a surface of the form or web, and the liquid portion passing through. In the claims, the term "porous body" includes the several types of depositing surfaces herein described. The invention, however, is not limited to any particular manner of deposition. Electrodeposition may be used advantageously as a method of deposition. The compositions given above may be employed in the manufacture of tubular articles of various sorts, hollow articles such as hot water bottles, etc., sheets, strips, threads, and irregularly shaped articles or objects. The invention is particularly adaptable to the formation of irregularly shaped articles for it makes possible the manufacture of such articles without the expensive molds which would otherwise be required. While the invention is primarily concerned with the direct utilization of vulcanized natural latex in the formation of rubber articles such as those mentioned above, the invention also comprehends the use of artificially prepared latices which are susceptible of the same treatment with advantage in the deposit of the rubber therefrom on porous bodies or forms. The invention also comprehends vulcanizing the latex completely or partially in connection with the process recited in the claims. It is further understood that the treated latex described herein may be utilized in the manufacture of rubber articles in any manner to which it is adaptable, such as coating, dipping, or any of the other manufacturing methods utilized in connection with uncoagulated natural latex or artificial latices, and in its broadest aspects the invention comprehends such use of the uncoagulated material.

Having thus described my invention, what I claim and desire to protect by Letters Patent is:

1. A process for manufacturing rubber articles from latex which consists in vulcanizing latex in the presence of a salt of a thiol acid, and depositing the rubber from the latex thus obtained directly on a porous form in the shape desired to make the article.

2. A process for manufacturing rubber articles from latex which consists in vulcanizing latex in the presence of a salt of a thiol acid and a metal in combination, and depositing the rubber from the latex thus obtained directly on a porous form in the shape desired to make the article.

3. A process for manufacturing rubber articles from latex which consists in vulcanizing latex in the presence of a salt of a thiol acid, sulphur, and a metal in combination, and depositing the rubber from the latex thus obtained directly on a porous form in the shape desired to make the article.

4. A process for manufacturing rubber articles from latex which consists in vulcanizing latex in the presence of an accelerator of the type $$RCSM \underset{X}{\|}$$

sulphur, and a metal in combination, and depositing the rubber from the latex thus obtained directly on a porous form in the shape desired to make the article.

5. A process for manufacturing rubber articles from latex which consists in vulcanizing latex in the presence of an accelerator of the type $$RCSM \underset{X}{\|}$$

sulphur, and a metal in combination, at temperature below approximately 212° F., and depositing the rubber from the latex thus obtained directly on a porous form in the shape desired to make the article.

6. A process for manufacturing rubber articles from latex which consists in vulcanizing latex in the presence of an accelerator of the type $$RCSM \underset{X}{\|}$$

sulphur, and a metal in combination, at approximately 150° F., and depositing the rubber from the latex thus obtained directly on a porous form in the shape desired to make the article.

7. A process for manufacturing rubber articles from latex which consists in vulcanizing latex in the presence of an accelerator of the type $$CCSM \underset{X}{\|}$$

sulphur, and a metallic oxide, at approximately 150° F., and depositing the rubber from the latex thus obtained directly on a porous form in the shape desired to make the article.

8. A process for manufacturing rubber articles from latex which consists in vulcanizing latex in the presence of an accelerator of the type $$CCSM \underset{X}{\|}$$

sulphur, and zinc oxide, at approximately 150° F., and depositing the rubber from the latex thus obtained directly on a porous form in the shape desired to make the article.

9. A process for manufacturing rubber articles from latex which consists in vulcanizing latex in the presence of a dithiobenzoate, sulphur, and zinc oxide, at approximately 150° F., and depositing the rubber from the latex thus obtained directly on a porous form in the shape desired to make the article.

10. A process for manufacturing rubber articles from latex which consists in vulcanizing latex in the presence of sodium dithiobenzoate, sulphur, and zinc oxide, at approximately 150° F., and depositing the rubber from the latex thus obtained directly on a porous form in the shape desired to make the article.

11. In a process for the manufacture of rubber articles by depositing rubber from a vulcanized latex upon a porous form of the shape desired, the step of vulcanizing the latex in the presence of a dithiobenzoate accelerator, sulphur, and a metallic oxide.

12. In a process for the manufacture of rubber articles by depositing rubber from a vulcanized latex upon a porous form of the shape desired, the step of vulcanizing the latex in the presence of sodium dithiobenzoate, sulphur, and zinc oxide.

13. In a process for the manufacture of rubber articles by depositing rubber from a vulcanized latex upon a porous form of the shape desired, the step of vulcanizing the latex in the presence of sodium dithiobenzoate, sulphur, and zinc oxide, at approximately 150° F.

Signed at New York, New York, this 15th day of September 1925.

SIDNEY M. CADWELL.